US012602324B2

(12) United States Patent
Guo et al.

(10) Patent No.:  US 12,602,324 B2
(45) Date of Patent:  Apr. 14, 2026

(54) STORAGE CONTROLLER, MEMORY MANAGEMENT METHOD AND STORAGE DEVICE

(71) Applicant: Hefei Kaimeng Technology Co., Ltd., Anhui (CN)

(72) Inventors: Lihong Guo, Anhui (CN); Jun Yin, Anhui (CN); Kaidi Zhu, Anhui (CN); Zhi Wang, Anhui (CN); Tsung-Lin Wu, Anhui (CN); Qiao Zhu, Anhui (CN)

(73) Assignee: Hefei Kaimeng Technology Co., Ltd., Anhui (CN)

( * ) Notice: Subject to any disclaimer, the term of this patent is extended or adjusted under 35 U.S.C. 154(b) by 94 days.

(21) Appl. No.: 18/822,415

(22) Filed: Sep. 2, 2024

(65) Prior Publication Data

US 2025/0231874 A1     Jul. 17, 2025

(30) Foreign Application Priority Data

Jan. 12, 2024     (CN) ......................... 202410044097.X

(51) Int. Cl.
*G06F 12/0802* (2016.01)
*G06F 12/02* (2006.01)

(52) U.S. Cl.
CPC ...... *G06F 12/0802* (2013.01); *G06F 12/0246* (2013.01); *G06F 2212/1016* (2013.01); *G06F 2212/7206* (2013.01)

(58) Field of Classification Search
CPC ......... G06F 12/0802; G06F 2212/1016; G06F 2212/7204; G06F 2212/7206;
(Continued)

(56) References Cited

U.S. PATENT DOCUMENTS

2016/0253093 A1     9/2016  Zhang
2017/0068488 A1*    3/2017  Shibatani ............... G11C 16/10
(Continued)

FOREIGN PATENT DOCUMENTS

CN          107357520          11/2017
CN          110321081          10/2019
(Continued)

*Primary Examiner* — Hosain T Alam
*Assistant Examiner* — Alan Otto
(74) *Attorney, Agent, or Firm* — JCIPRNET

(57) ABSTRACT

The disclosure discloses a storage controller, a memory management method, and a storage device, the memory management method including: identifying a current power mode of a host system; obtaining a target command from a command queue; in response to determining that the target command is used to enable a write booster mode, determining whether the power mode is a highest level; in response to determining that the power mode is the highest level, determining whether a cache block currently in use is a physical block of a triple-level cell type; in response to determining that the cache block currently in use belongs to the triple-level cell type, freezing the cache block of the triple-level cell type; using a physical block of a single-level cell type as a new cache block to write cache data; and enabling the write booster mode, and sending an enabling completed response.

15 Claims, 5 Drawing Sheets

(58) Field of Classification Search
CPC ......... G06F 2212/7208; G06F 12/0246; G06F
3/0604; G06F 3/0634; G06F 3/064; G06F
3/0658; G06F 3/0659; G06F 3/0679;
Y02D 10/00
See application file for complete search history.

(56) References Cited

U.S. PATENT DOCUMENTS

| | | |
|---|---|---|
| 2017/0214701 A1 | 7/2017 | Hasan |
| 2019/0065080 A1 | 2/2019 | Tanpairoj et al. |
| 2021/0035627 A1 | 2/2021 | Tanpairoj et al. |
| 2023/0367491 A1* | 11/2023 | Zhao ..................... G06F 3/0659 |
| 2024/0241665 A1* | 7/2024 | He .......................... G06F 3/061 |

FOREIGN PATENT DOCUMENTS

| | | |
|---|---|---|
| CN | 111625197 | 9/2020 |
| CN | 113138720 | 7/2021 |
| CN | 113703681 | 11/2021 |

* cited by examiner

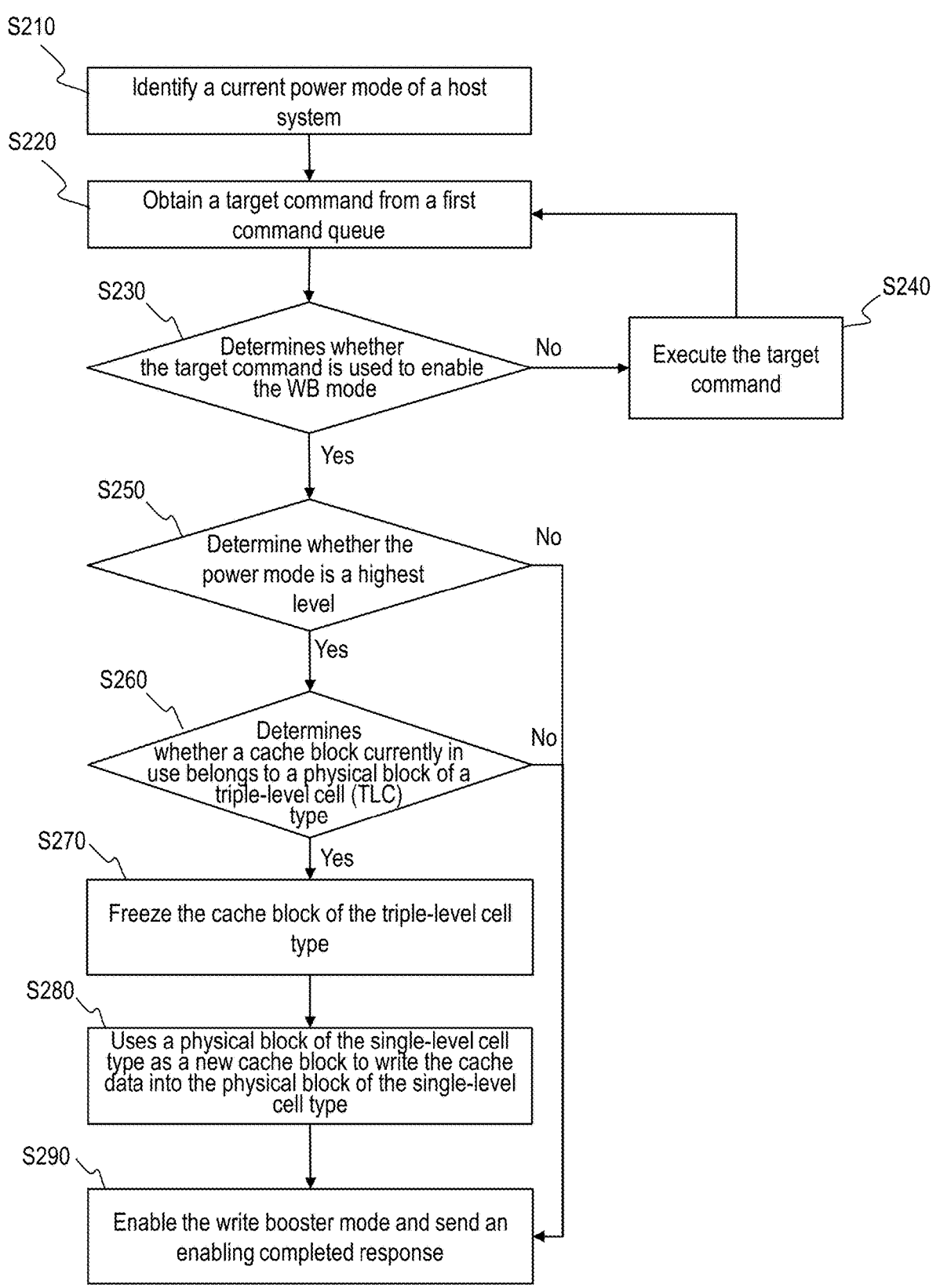

S210

Identify a current power mode of a host
system

S220

Obtain a target command from a first
command queue

S230

Determines whether
the target command is used to enable
the WB mode

No

S240

Execute the target
command

Yes

S250

Determine whether the
power mode is a highest
level

No

Yes

S260

Determines
whether a cache block currently in
use belongs to a physical block of a
triple-level cell (TLC)
type No Yes

S270

Freeze the cache block of the triple-level cell
type

S280

Uses a physical block of the single-level cell
type as a new cache block to write the cache
data into the physical block of the single-level
cell type

S290

Enable the write booster mode and send an
enabling completed response

FIG. 2

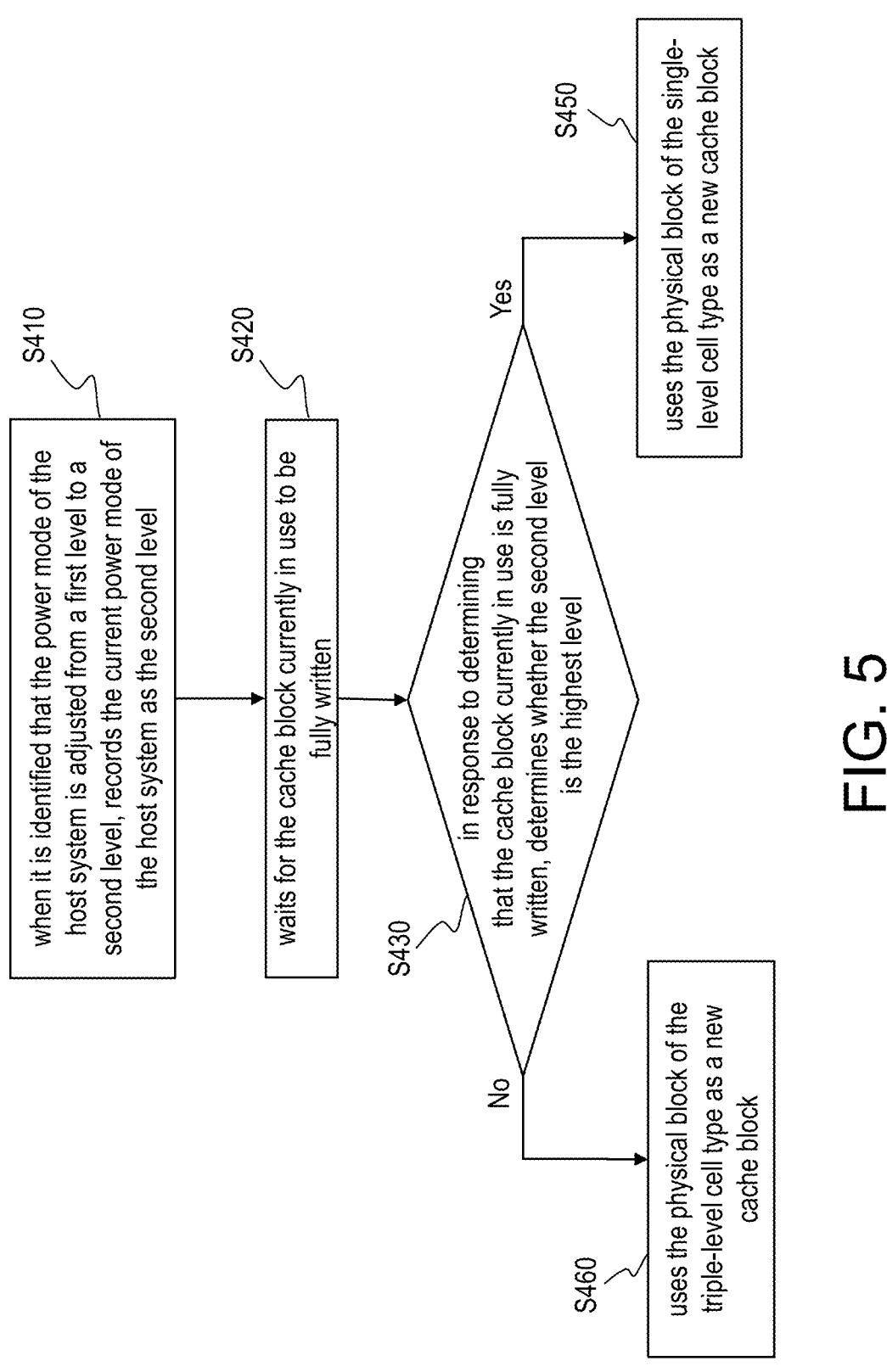

S410 when it is identified that the power mode of the host system is adjusted from a first level to a second level, records the current power mode of the host system as the second level

S420 waits for the cache block currently in use to be fully written

S430 in response to determining that the cache block currently in use is fully written, determines whether the second level is the highest level Yes

S450 uses the physical block of the single-level cell type as a new cache block

No

S460 uses the physical block of the triple-level cell type as a new cache block

FIG. 5

STORAGE CONTROLLER, MEMORY MANAGEMENT METHOD AND STORAGE DEVICE

CROSS-REFERENCE TO RELATED APPLICATION

This application claims the priority benefit of China application serial no. 202410044097.X, filed on Jan. 12, 2024. The entirety of the above-mentioned patent application is hereby incorporated by reference herein and made a part of this specification.

BACKGROUND

Technical Field

The disclosure relates to a memory management technology, and particularly relates to a storage controller, a memory management method, and a storage device.

Description of Related Art

Non-volatile memory refers to computer memory whose stored data does not disappear when the current is cut off, which has the advantages of non-volatility, power saving, small size, and no mechanical structure, and is widely used in various electronic devices. Common non-volatile memory is a memory configured with a flash memory (such as a solid-state drive), which has the characteristics of high read and write speed and does not require a mechanical structure to access data. The flash memory includes memory cells to form a plurality of physical pages, and each memory cell may store 1 or 3 bits of data. The type of memory cell storing 3 bits is a triple-level cell (TLC); the type of memory cell storing 1 bit is a single-level cell (SLC). The characteristics of SLC are faster storage speed and better stability, while the characteristic of TLC is larger available storage space.

Write booster (WB) is a function that can improve write performance. By enabling the WB function, data is written to the SLC cache block first, which can improve data write performance by taking advantage of the better performance of SLC than TLC. However, in actual application scenarios, the host system may switch to different speeds at different times, so that at some host speeds, there is not much difference in the write performance of writing data to SLC cache blocks or TLC cache blocks. In different writing scenarios, the application of the WB function has the problem of unreasonable resource allocation.

SUMMARY

The purpose of the disclosure is to solve the problem of unreasonable resource allocation when applying the WB function in different writing scenarios. The disclosure proposes a storage controller, a memory management method, and a storage device, which may take into account a variety of situations, so that when applying the WB function, based on the power mode (the power mode correspond to different host speeds) of the host system, the memory adjusts the type of cache blocks used by different write strategies according to actual scenarios. For example, an appropriate cache type (SLC or TLC) is selected for writing to improve a reasonable resource allocation of the non-volatile memory in different writing scenarios.

An embodiment of the disclosure provides a storage configured to control a storage device disposed with a rewritable non-volatile memory module. The storage controller includes the following. A memory interface control circuit and a processor are provided. The memory interface control circuit is used to electrically connect to the rewritable non-volatile memory module, in which the rewritable non-volatile memory module includes a plurality of memory dies, each of the memory dies has a plurality of physical blocks. The processor is electrically connected to the memory interface control circuit, in which the processor is configured to perform the following. A current power mode of a host system is identified. A target command is obtained from a command queue. In response to determining that the target command is used to enable a write booster mode, whether the power mode is a highest level is determined; in response to determining that the power mode is the highest level, whether the cache block currently in use belongs to the triple-level cell type is determined; in response to determining that the cache block currently in use belongs to the triple-level cell type, the cache block of the triple-level cell type is frozen; a physical block of the single-level cell type is used as the new cache block to write cache data into the new cache block; and the write booster mode is enabled, and an enabling completed response is sent.

In an embodiment of the disclosure, in response to determining that the target command is not configured to enable the write booster mode, the processor executes the target command.

In an embodiment of the disclosure, in response to determining that the current power mode is not the highest level, the processor enables the write booster mode and sends the enabling completed response.

In an embodiment of the disclosure, in response to determining that the current cache block does not belong to the physical block of the triple-level cell type, the processor enables the write booster mode and sends the enabling completed response.

In an embodiment of the disclosure, when generating the physical block of the single-level cell type or generating the physical block of the triple-level cell type, the target command is obtained from the command queue.

In response to determining that the target command is used to detect the level of the power mode and the type of the cache block, whether the power mode is the highest level is determined, and whether the type of the cache block currently in use belongs to the triple-level cell type is determined.

When the power mode is the highest level and the type of the cache block currently in use belongs to the triple-level cell type, the type of the cache block to be generated next is determined to be the single-level cell type.

In an embodiment of the disclosure, when it is identified that the power mode of the host system is adjusted from the first level to the second level, the storage controller records the current power mode of the host system as the second level, the storage controller waits for the cache block currently in use to be fully written, in response to determining that the cache block currently in use is fully written, the storage controller determines whether the second level is the highest level, in response to the second level being the highest level, the storage controller uses the physical block of the single-level cell type as the new cache block, in response to the second level not being the highest level, the storage controller uses the physical block of the triple-level cell type as the new cache block.

In an embodiment of the disclosure, a current host speed stage is determined. One or more stage coefficients is obtained according to the current host speed stage. Multiple host speed values are obtained in the host speed stage, and the acceleration rate corresponding to the host speed stage is obtained according to the multiple host speed values. Each time when the power mode of a low level is switched to the power mode of a next high level, an advance value is obtained according to the stage coefficient and the acceleration rate corresponding to the power mode of the low level, a change time of switching to the power mode of the next high level is determined according to the advance value, and the power mode of the next higher level includes the power mode of the highest level.

In an embodiment of the disclosure, before or when a switch block is generated, the data operation state is obtained. When the data operation state is a non-processing state, a priority storage command is obtained from the command queue, wherein the priority storage command is configured to force data to be written from a cache storage to a storage medium, and the priority storage command comprises a first indication parameter; in response to receiving the first indication parameter, a write restriction command is sent to the host system according to the first indication parameter, and the write restriction command includes a second indication parameter. When the host system parses the second indication parameter, logic of the host system sending write commands is modified according to the second indication parameter, so that the host system restricts sending the write commands within a time period, and until a return parameter of the first write command corresponding to the switch block is received, the original logic of the host system sending the write commands is restored.

Another embodiment of the disclosure provides a memory management method for a storage controller, which includes the following. A current power mode of a host system is identified. A target command is obtained from a command queue. In response to determining that the target command is used to enable a write booster mode, whether the power mode is a highest level is determined; in response to determining that the power mode is the highest level, whether the cache block currently in use belongs to the triple-level cell type is determined; in response to determining that the cache block currently in use belongs to the triple-level cell type, the cache block of the triple-level cell type is frozen; the physical block of the single-level cell type is used as the new cache block to write cache data into the new cache block; and the write booster mode is enabled, and an enabling completed response is sent.

Another embodiment of the disclosure provides a storage device, which includes the following. A connection interface circuit, a rewritable non-volatile memory module, and a storage controller are provided. The connection interface circuit is used to electrically connect to a host system. The rewritable non-volatile memory module includes a plurality of memory dies, in which each of the memory dies has a plurality of physical blocks, and each of the physical blocks has a plurality of physical pages. The storage controller is electrically connected to the connection interface circuit and the rewritable non-volatile memory module. The storage controller is used to perform the following. A current power mode of a host system is identified. A target command is obtained from a command queue. In response to determining that the target command is used to enable a write booster mode, whether the power mode is a highest level is determined; in response to determining that the power mode is the highest level, whether the cache block currently in use belongs to the triple-level cell type is determined; in response to determining that the cache block currently in use belongs to the triple-level cell type, the cache block of the triple-level cell type is frozen; the physical block of the single-level cell type is used as the new cache block to write cache data into the new cache block; and the write booster mode is enabled, and an enabling completed response is sent.

Based on the above, the storage device, the storage controller, and the memory management method used by the storage controller provided in embodiments of the disclosure can determine the type of the cache block to be generated next according to different actual situations in the application scenario where the write booster (WB) function is enabled, thereby a reasonable resource allocation of the storage device is realized as much as possible at each point in time.

BRIEF DESCRIPTION OF THE DRAWINGS

The accompanying drawings are included to provide a further understanding of the disclosure, and the drawings are incorporated into and constitute a part of this specification. The drawings illustrate the embodiments of the disclosure and, together with the description, serve to explain the principles of the disclosure.

FIG. 2 is a flow chart of a memory management method according to an embodiment of the disclosure.

FIG. 5 is a flow chart of a memory management method according to another embodiment of the disclosure.

DESCRIPTION OF THE EMBODIMENTS

Figure 1:
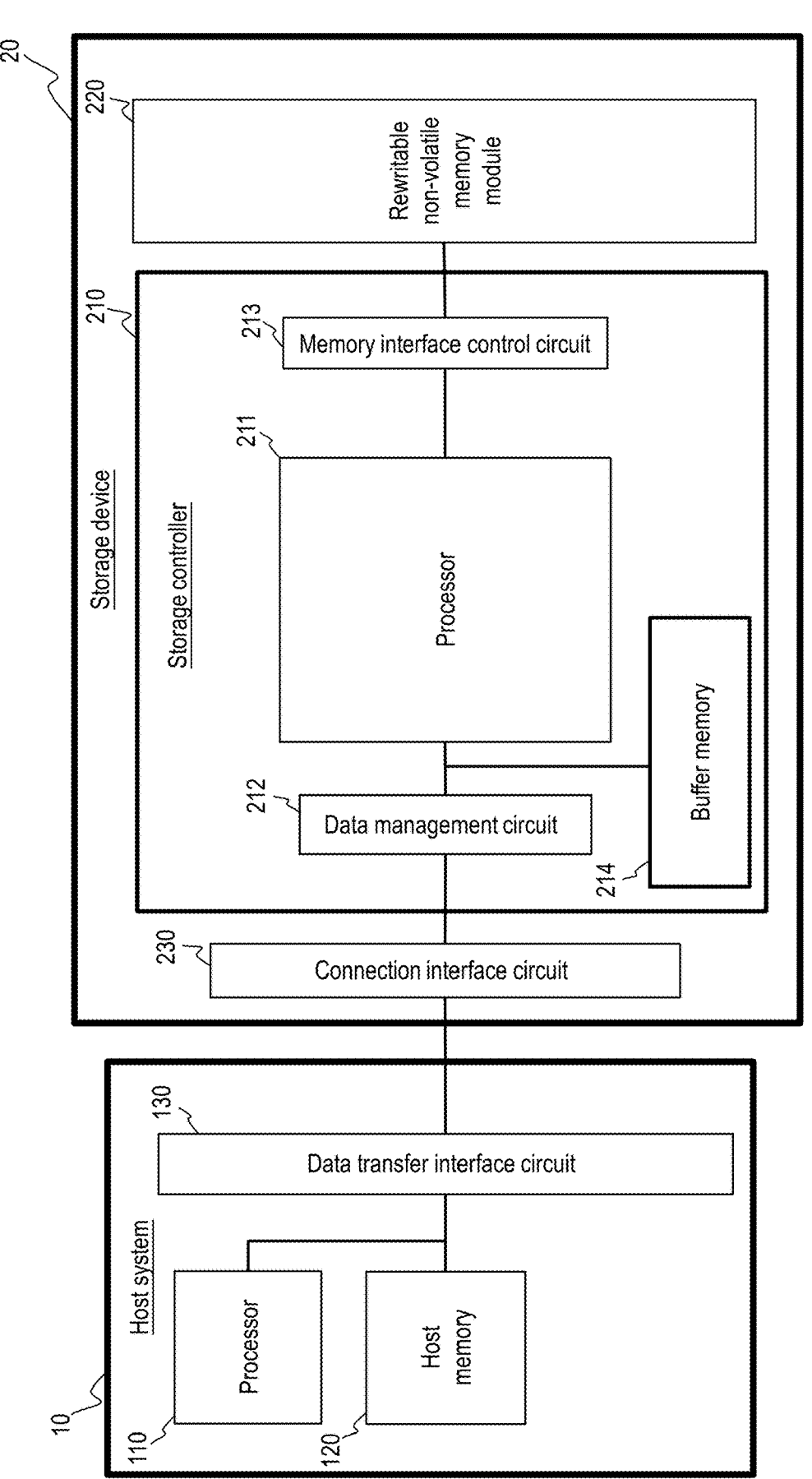
FIG. 1 is a block diagram of a host system and a storage device according to an embodiment of the disclosure.

Reference will now be made in detail to exemplary embodiments of the disclosure, examples of the embodiments are illustrated in the accompanying drawings. Whenever possible, the same reference numerals in the drawings and the description are used to refer to the same or similar parts.

FIG. 1 is a block diagram of a host system and a storage device according to an embodiment of the disclosure. Referring to FIG. 1, a host system 10 is, for example, a personal computer, a laptop computer, or a server. The host system 10 includes a processor 110 of the host system 10, a host memory 120, and a data transfer interface circuit 130. In this embodiment, the processor 110 of the host system 10 is electrically connected to the host memory 120 and the data transfer interface circuit 130. In another embodiment, the processor 110 of the host system 10, the host memory 120, and the data transfer interface circuit 130 are electrically connected to each other using a system bus. In this embodiment, the processor 110 of the host system 10, the host memory 120, and the data transfer interface circuit 130 may be disposed on a motherboard of the host system 10.

A storage device 20 includes a storage controller 210, a rewritable non-volatile memory module 220, and a connection interface circuit 230, in which the storage controller 210 includes a processor 211 of the storage device 20, a data management circuit 212, and a memory interface control circuit 213.

In this embodiment, the host system 10 is electrically connected to the storage device 20 through the data transfer interface circuit 130 and the connection interface circuit 230 of the storage device 20 to perform data access operations. For example, the host system 10 may store data to the storage device 20 or read data from the storage device 20 via the data transfer interface circuit 130.

In this embodiment, the number of the data transfer interface circuit 130 may be one or more. Through the data transfer interface circuit 130, the motherboard may be electrically connected to the storage device 20 via a wired or wireless manner. The storage device 20 may be, for example, a USB flash drive, a memory card, a solid state drive (SSD), or a wireless storage device. The wireless storage device may be, for example, a storage device based on various wireless communication technologies such as a near field communication (NFC) storage device, a WiFi storage device, a Bluetooth storage device, or a low-power Bluetooth storage device (for example, iBeacon). In addition, the motherboard may also be electrically connected to various I/O devices such as a global positioning system (GPS) module, a network interface card, a wireless transmission device, a keyboard, a monitor, and a speaker through the system bus.

In this embodiment, the data transfer interface circuit 130 and the connection interface circuit 230 are interface circuits compatible with the peripheral component interconnect express (PCI Express) standard. Also, between the data transfer interface circuit 130 and the connection interface circuit 230, the non-volatile memory express (NVMe) communication protocol is utilized to transfer data.

Furthermore, in another embodiment, the connection interface circuit 230 and the storage controller 210 may be packaged in one chip, or the connection interface circuit 230 may be disposed outside a chip comprising the storage controller 210.

In this embodiment, the host memory 120 is used to temporarily store commands or data executed by the processor 110 of the host system 10. For example, in this embodiment, the host memory 120 may be a dynamic random access memory (DRAM), or a static random access memory (SRAM). However, it should be understood that the disclosure is not limited thereto, and the host memory 120 may also be other suitable memories.

The storage controller 210 is used to execute a plurality of logic gates or control commands implemented in a hardware manner or a firmware manner and to perform operations such as writing, reading, and erasing data in the rewritable non-volatile memory module 220 according to the commands of the host system 10.

In more detail, the processor 211 of the storage device 20 in the storage controller 210 is a hardware with computing capabilities, which is used to control the overall operation of the storage controller 210. Specifically, the processor 211 of the storage device 20 is programmed with a plurality of control commands/program codes, and when the storage device 20 is in operation, the control commands/program codes are executed to perform operations such as writing, reading, and erasing data. In addition, in this embodiment, the control commands/program codes may be further executed to perform memory management operations (also referred to as cache block management operations) to implement a memory management method provided by the disclosure. The control commands/program codes corresponding to the memory management method may further be implemented as a circuit unit in the form of hardware to realize the memory management method provided by the disclosure.

It should be noted that, in this embodiment, the processor 110 of the host system 10 and the processor 211 of the storage device 20 are, for example, central processing units (CPUs), micro-processors, or other programmable micro-processors, digital signal processors (DSPs), programmable controllers, application specific integrated circuits (ASICs), programmable logic devices (PLD), or other similar circuit components, and the disclosure is not limited thereto.

In this embodiment, as described above, the storage controller 210 further includes the data management circuit 212 and the memory interface control circuit 213. It should be noted that operations performed by components of the storage controller 210 may also be regarded as operations performed by the storage controller 210.

The data management circuit 212 is electrically connected to the processor 211 of the storage device 20, the memory interface control circuit 213, and the connection interface circuit 230. The data management circuit 212 is used to receive commands from the processor 211 of the storage device 20 to transfer data. For example, data is read from the host system 10 (for example, the host memory 120) via the connection interface circuit 230, the data read is written into the rewritable non-volatile memory module 220 via the memory interface control circuit 213 (for example, a write operation is performed according to a write command from the host system 10). For another example, data is read from one or more physical units of the rewritable non-volatile memory module 220 via the memory interface control circuit 213, and the data read is written into the host system 10 (for example, the host memory 120) via the connection interface circuit 230 (for example, a read operation is performed according to a read command from the host system 10). In another embodiment, the data management circuit 212 may also be integrated into the processor 211 of the storage device 20.

The memory interface control circuit 213 is used to receive commands from the processor 211 of the storage device 20, and together with the data management circuit 212, write (also referred to as programming) operations, read operations, or erase operations are performed on the rewritable non-volatile memory module 220.

In an embodiment, the storage controller 210 further includes a buffer memory 214. The buffer memory 214 is electrically connected to the processor 211 of the storage device 20 and is used to temporarily store data and commands from the host system 10, data from the rewritable non-volatile memory module 220, or other system data (for example, a current power mode of the host system 10 or a corresponding speed mode) used to manage the storage device 20, so that the processor 211 of the storage device 20 may quickly access the data, commands, or the system data from the buffer memory 214.

The rewritable non-volatile memory module 220 is electrically connected to the storage controller 210 (the memory interface control circuit 213) and is used to store data written by the host system 10. In this embodiment, the rewritable non-volatile memory module 220 has a plurality of word lines, in which each of the plurality of word lines is coupled to a plurality of memory cells (each memory cell may store one or more bits of data according to the form of the memory die), also referred to as a column (also referred to as a physical column). Multiple columns on the same word line form a physical programming unit (also referred to as a physical page). In addition, multiple physical pages may form a physical block (also referred to as a physical erase unit). Each of the plurality of memory dies of the rewritable non-volatile memory module has a plurality of physical blocks. In this embodiment, each memory cell may store 1 or 3 bits of data. The type of memory cell storing 3 bits is a triple-level cell (TLC); the type of memory cell storing 1 bit is a single-level cell (SLC). The characteristics of the SLC are faster storage speed and better stability, while the characteristic of the TLC is larger available storage space. All memory cells in a physical block belong to the same type. For example, the physical block may be a single-level cell physical block in which all memory cells belong to the single-level cell type, or a triple-level cell physical block in which all memory cells belong to the triple-level cell type. In addition, in this embodiment, the storage controller 210 may use one of the multiple physical blocks of the rewritable non-volatile memory module 220 as a cache block currently used for temporarily storing data.

FIG. 2 is a flow chart of the memory management method according to an embodiment of the disclosure.

Referring to FIG. 2, in step S210, the storage controller 210 (or the processor 211 of the storage device 20) identifies the current power mode of the host system 10. The power mode includes multiple corresponding power consumption levels from large to small. For example, power modes with different power consumption levels may correspond to different host speeds. Specifically, the host speed may be divided into multiple gears, for example, gear1, gear2, gear3, and gear4 respectively. In the disclosure, when the specific host speed gear is gear1, gear2, and gear3, the write rate of using SLC cache blocks to implement writing and storing data is not faster than the write rate of using TLC cache blocks to implement writing and storing data, and at this time, due to the limitation of the host speed, the upper limit of the write rate of writing data into the memory block is close to or the same as the host speed; in the disclosure, when the host speed is gear4, the upper limit of the write rate of writing data into the memory block is not limited by the host speed, and at this time, the write rate of writing and storing data using the SLC cache block is faster than the write rate of writing and storing data using the TLC cache block. However, the current WB function is limited to writing data to the SLC first without considering various situations that may actually occur.

When the host system 10 switches the power mode, the storage controller 210 may obtain relevant information and record the current power mode of the host system 10 (for example, record in the buffer memory 214), according to different host speeds corresponding to the power modes, whether the SLC data writing manner may be faster than the TLC data writing manner when the write booster mode (that is, the WB mode) is enabled is determined, so as to achieve a reasonable resource allocation. In addition, since the SLC is not abused when the host speed is low (the SLC cache block is used as a transitional cache, and data written to the SLC needs to be written to the TLC cache block after a while), directly using TLC cache blocks to write data when the host speed is in gear 1, gear 2, and gear 3 may significantly reduce the WAF (write amplification factor).

Next, in step S220, the storage controller 210 obtains a target command from a command queue. The command queue is used to temporarily store multiple commands to be executed. The commands to be executed are stored in the command queue, and on a first-in-first-out basis, the storage controller 210 obtains a currently executed target command from the command queue, in which the target command may include commands for implementing certain specific functions such as enabling the WB mode and generating (creating) cache data blocks.

Next, specifically in step S230, the storage controller 210 determines whether the target command is used to enable the WB mode.

In response to determining that the target command is used to enable the write booster (WB) mode, step S250 is executed; in response to determining that the target command is not used to enable the write booster mode, step S240 is executed. In step S240, the storage controller 210 executes the target command, that is, steps S250 to S290 are not executed.

On the other hand, in step S250, the storage controller 210 determines whether the power mode is a highest level, in which the highest level may specifically correspond to gear 4 of the host speed.

In response to determining that the power mode is the highest level, step S260 is executed; in response to determining that the power mode is not at the highest level, step S290 is executed.

Next, in step S260, the storage controller 210 determines whether a cache block currently in use belongs to a triple-level cell (TLC) type. From steps S250 and S260, it may be seen that steps S270 to S290 are executed only when the both determining criteria corresponding to the storage controller 210 are satisfied.

In response to determining that the cache block currently in use belongs to the triple-level cell type, step S270 is executed; in response to determining that the cache block currently in use does not belong to the physical block of the triple-level cell type, step S290 is executed.

In an embodiment, when the WB mode is enabled, the disclosure further obtains information about the power mode of the host system 10 and the cache block type (including, for example, SLC and TLC) used by the storage device when currently implementing storing data. Therefore, the type of the cache block preferred to be used in a next near time period may be determined according to the information. It is understandable that in the related art, once the WB mode is enabled, only the SLC cache block is used to implement writing and storing data until the cache portion of the SLC cache block is used up. However, in actual application scenarios, the write rate of the SLC cache block is not necessarily higher than the TLC cache block. In some scenarios where the host speed and the host performance are limited, there is not much difference between using the SLC cache block and using the TLC cache block in terms of the write rate of data. Therefore, the disclosure considers adopting different coping manners in different application scenarios to achieve a highly matching switching method between the SLC cache block and the TLC cache block, which can always find a most suitable cache block type in the constantly changing scenarios, thereby the degree of reasonable resource allocation is significantly improved, and the WAF is effectively reduced.

Next, in step S270, the storage controller 210 freezes the cache block of the triple-level cell type. For example, the storage controller 210 directly close the cache block of the triple-level cell type and does not write subsequent cache data into the cache block. In another embodiment, the storage controller 210 may wait until the triple-level cell type currently in use is fully written with cache data before terminating the cache block.

It should be noted that the freezing operation may be understood as an operation of switching from the TLC cache block to the SLC cache block, and marking the TLC cache block and using the block as a current last TLC cache block. The operation includes but is not limited to the above-mentioned direct termination of writing and storing data of the TLC cache block, and instead data is written and stored into the SLC cache block; the operation may also include filling the current TLC cache block with data and then using the SLC cache block in a next writing and storing data stage. It may be understood that in the disclosure, when the WB mode is enabled, the main operations are operations on the TLC cache block, and the SLC cache block may be automatically generated after some determined TLC cache block operations, and in this process, the SLC cache block is a result of determining criteria, while the TLC cache block is more of a reference for whether to generate the SLC cache block. In this mode, the storage device only needs to analyze the status of the TLC cache block, without having to analyze from the perspective of the SLC cache block, so that whether to use the SLC cache block can be determined in different actual application scenarios in a simple, accurate, and fast manner, thereby the degree of reasonable resource allocation of the storage device in different writing scenarios is significantly improved.

Next, in step S280, the storage controller 210 uses a physical block of the single-level cell type as a new cache block to write the cache data into the physical block of the single-level cell type.

Next, in step S290, the storage controller 210 enables the write booster mode and sends an enabling completed response. The enabling completed response is used to notify the host system 10 that the write booster (WB) function/mode of the storage device 20 has been enabled.

Figure 3:
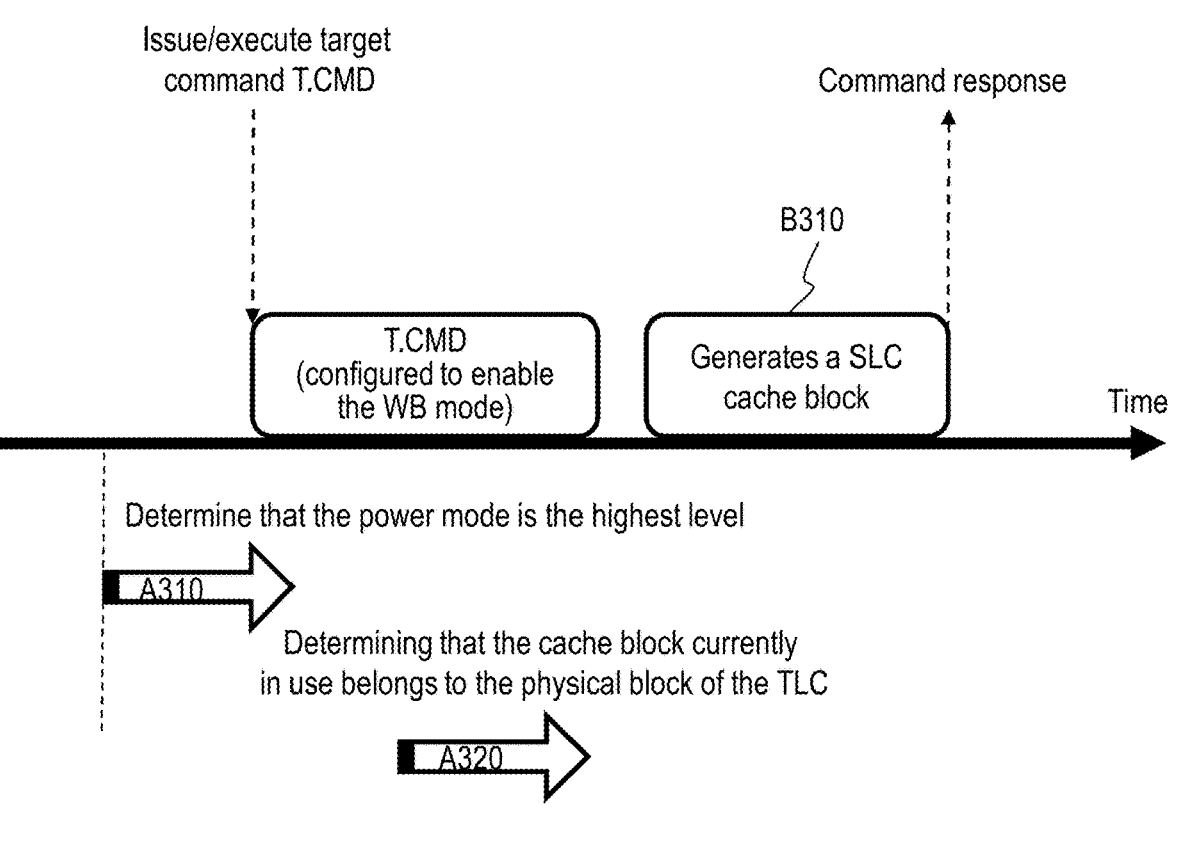
FIG. 3 is a schematic diagram showing whether to generate an SLC cache block according to a target command and a power mode of a host system according to an embodiment of the disclosure.
Figure 4:
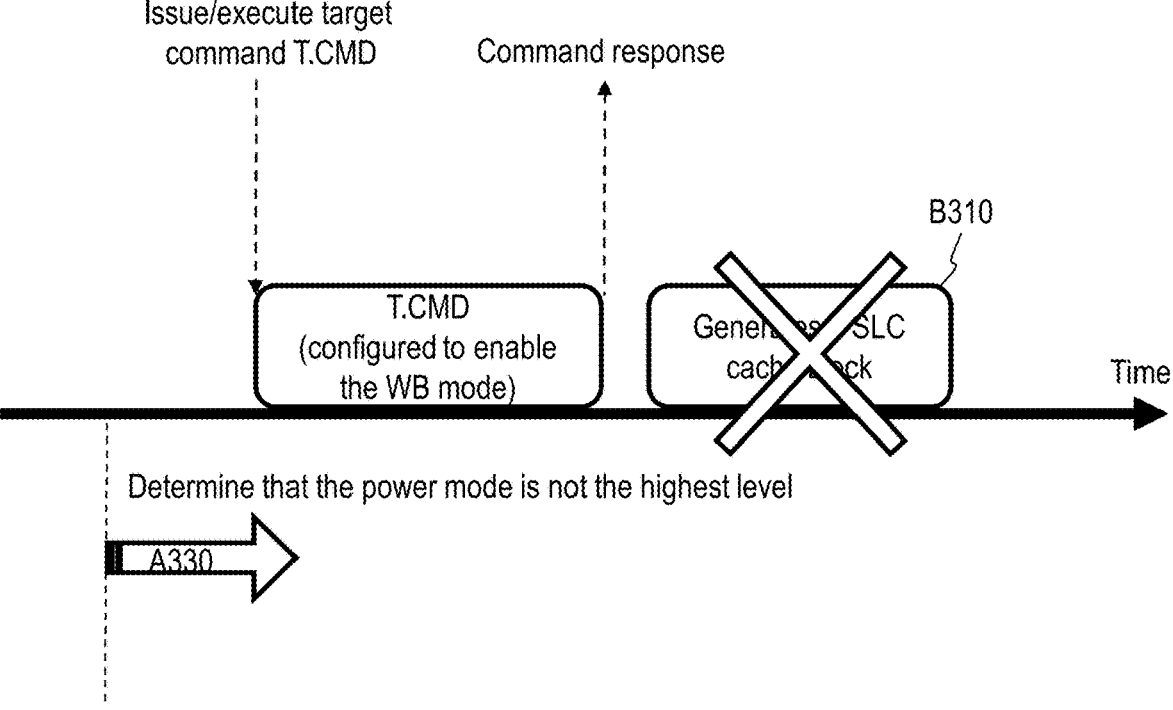
FIG. 4 is another schematic diagram showing whether to generate an SLC cache block according to a target command and a power mode of a host system according to another embodiment of the disclosure.

FIG. 3 is a schematic diagram showing whether to generate the SLC cache block according to the target command and the power mode of the host system 10 according to an embodiment of the disclosure; and FIG. 4 is another schematic diagram showing whether to generate the SLC cache block according to the target command and the power mode of the host system 10 according to an embodiment of the disclosure.

For example, referring to FIG. 3, in an embodiment, as indicated by an arrow A310, assuming that the storage controller 210 determines that the power mode of the host system 10 is the highest level (that is, corresponding to the host speed gear4), and the storage controller 210 obtains a target command T.CMD from the command queue. In addition, before sending a command response, in response to determining that the target command T.CMD is used to enable the WB mode, and determining that the cache block currently in use belongs to TLC type (as shown by an arrow A320), the storage controller 210 generates a SLC cache block (for example, selects a SLC physical block as the cache block) (as shown in step B310), write booster of the storage device 20 is enabled, and the command response corresponding to the target command T.CMD (responding that the write booster has been enabled) is sent to the host system 10. That is, before sending the corresponding command response to the host system 10, when the power mode is the highest level and the cache block currently in use belongs to the TLC type, then the storage controller 210 first generates the SLC cache block.

For another example, referring to FIG. 4, as indicated by an arrow A330, assuming that the storage controller 210 determines that the power mode of the host system 10 is not the highest level (that is, corresponding to the host speed gear1 to gear3), and the storage controller 210 obtains the target command T.CMD from the command queue. In addition, the storage controller 210 determines that the target command T.CMD is used to enable the WB mode. In this embodiment, since it is determined that the power mode is not the highest level, the storage controller 210 does not generate the SLC cache block, and the command response is directly sent to the host system 10.

In the disclosure, in addition to sending the target command to detect the power mode of the host system 10 and the type of the cache block currently in use by the storage device when the WB mode is enabled, a cache block type switching method for coping with different scenarios while continuing in the WB mode is also considered. Specifically, each time a cache block is to be generated, a target command is sent to detect the power mode of the host system 10, so that the cache block type used by the next cache block to be generated may be determined in advance.

In an embodiment, when generating a block, the disclosure further performs operations as follows.

When generating a physical block of a single-level cell type or generating a physical block of a triple-level cell type, a target command is obtained from a command queue.

In response to determining that the target command is used to detect the level of the power mode and the type of the cache block, whether the power mode is the highest level is determined, and whether the type of the cache block currently in use belongs to TLC type is determined.

When the power mode is the highest level and the type of the cache block currently in use belongs to TLC type, a type of a cache block to be generated next is determined as SLC type.

It may be seen that in the above steps, after enabling the WB function command is issued, when the SLC cache block or the TLC cache block is actually generated, a detection is performed again. It should be understood that the level of the power mode and the type of the current cache block may change at any time, the disclosure may detect the level of the power mode and the type of the current cache block again through the target command having detecting function in the cache block generating stage, so as to accurately determine the type of the cache block to be generated next, thereby the switching of the types of the cache block that may occur during a period of blank time after the WB function is enabled can be avoided.

FIG. 5 is a flow chart of the memory management method according to another embodiment of the disclosure. In an embodiment, after the write booster mode has been enabled, the storage controller 210 is switched to the highest level according to the current power mode of the host system 10 and uses the SLC physical block as the cache block.

Referring to FIG. 5, in step S410, when it is identified that the power mode of the host system 10 is adjusted from a first level to a second level, the storage controller 210 records the current power mode of the host system 10 as the second level. That is, every time the power mode of the host system 10 is switched, the storage controller 210 records the current power mode that has been switched.

Next, in step S420, the storage controller 210 waits for the cache block currently in use to be fully written. Next, in step S430, in response to determining that the cache block currently in use is fully written, the storage controller 210 determines whether the second level is the highest level. That is, after the cache block currently in use is fully written, the storage controller 210 determines whether the current power mode of the host system 10 is the highest level.

In response to determining that the second level is the highest level, step S450 is executed; in response to determining that the second level is not the highest level, step S460 is executed.

In step S450, the storage controller 210 uses the physical block of the single-level cell type as a new cache block. That is, when the power mode is switched to the highest level, the storage controller 210 uses the SLC physical block as the cache block to write cache data.

In step S460, the storage controller 210 uses the physical block of the triple-level cell type as a new cache block. That is, when the power mode is switched to a level other than the highest level, the storage controller 210 uses the TLC physical blocks as the cache block to write cache data.

It should be understood that when switching from the highest level power mode to other lower level power modes, the efficiency of writing data is affected by the lower level power modes. In order to improve reasonable resource allocation of storage resources and avoid increasing WAF, the SLC cache block should not be generated. Therefore, during the cache block generating stage, the power mode is additionally detected to determine the type of the cache block to be generated. On the contrary, when the power mode is switched from the lower levels to the highest level, since the efficiency of writing data is not affected by the highest level power mode, the storage controller 210 may generate the SLC cache block to further improve the writing performance.

However, in specific research and implementation, the above implementation process faces some technical difficulties. For example, when WB is enabled (when the write booster function is activated or triggered), the operation of determining the power mode is added to generate the cache block, when changing the type of the cache block (for example, switching from SLC to TLC or from TLC to SLC), there is a significant delay in the subsequent first write. Some solutions corresponding to the situations are proposed as follows.

When the power mode is switched from the highest level to the lower levels, it may be determined that the type of the next cache block to be generated is TLC. However, due to the timeliness of detecting the power mode (if the detection signal is always sent at a high frequency, then a lot of power is consumed), when the power mode is detected to be switched to the lower levels, the power mode may actually have been at a low level for some time. Likewise, when the power mode is switched from a low level to the highest level, when the power mode is detected to be switched to the highest level, the power mode may actually have been at the highest level for some time. In this case, the disclosure proposes a feasible solution to the problem of power mode information lag when the power mode is switched from a low level to the highest level, which includes as follows.

A current host speed stage is determined.

According to the current host speed stage, one or more stage coefficients are obtained.

In the same host speed stage, multiple host speed values are obtained, and according to the multiple host speed values, an acceleration rate corresponding to the host speed stage is obtained.

Each time when switching from a power mode of a low level to a power mode of a next high level, according to the stage coefficient and the acceleration rate corresponding to the power mode of the low level, an advance value is obtained, and according to the advance value, a change time of switching to the power mode of the next high level is determined, in which the power mode of the next high level includes the power mode of the highest level.

Furthermore, in the test optimization stage, the change time corresponding to the power mode of the next high level may be compared with the change time of the power mode detected by the detection signal sent at an ultra-high frequency, if a difference between the two change times exceeds a preset threshold, then a reverse error compensation is performed based on the difference, so that the change time corresponding to the next high level power mode calculated next time is close to the actual change time of the power mode, thereby the problem of power mode information lag that may occur when the power mode is switched from a low level to other higher levels may be further relieved.

Specifically, in the disclosure, an advance value $\gamma$ may be set to predict an approximate time when the highest level occurs. The advance value $\gamma$ is related to an acceleration rate a and a stage coefficient Lc, in which the acceleration rate a describes change of speed at a certain host speed stage, and the stage coefficient Lc describes influence under the coefficient of the acceleration rate a at different host speed stages, in which a stage coefficient Lc1 of the lowest level power mode (gear1) may be set as a basic base number, which is an initial reference value of the other stage coefficients Lc, a stage coefficient Lc2 of the gear2 stage may be set to 1.2 times the basic base number, and a stage coefficient Lc3 of the gear3 stage may be set to 1.5 times the basic base number. For the acceleration rate a, the change of the host speed may be determined through the specific host speed value corresponding to each power mode detected (different power modes correspond to different gears, and a gear is a host speed range interval) according to detection signals, and the acceleration rate a may be obtained. It should be noted that at different host speed stages, that is, in different power modes, the acceleration rate is additionally adjusted upward in advance (since the latter rate is faster, there are some errors in measuring the latter value with the former acceleration). Therefore, through analyzing the specific value changes at different host speed stages, the change trend of the host speed value is approximately simulated based on the acceleration rate a and the stage coefficient Lc, and this change trend is used to predict the time reaching the gear4 threshold in advance in the form of the advance value $\gamma$. In this way, when the arrival time of gear4 may be predicted in advance, the high frequency of sending the detection signals may be reduced, and an appropriate time may be selected to switch the TLC cache block to the SLC cache block, so as to reasonably allocate storage resources in different application scenarios and effectively reduce WAF.

In the disclosure, the power mode may be obtained in real time without relying on commands to generate the corresponding type of cache block, and the SLC cache blocks may be automatically generated when the power mode is predicted to be close to the highest level. For example, the host system 10 may initially use a lower power mode. When the power mode changes toward the highest power mode, the occurrence time of the highest level may be predicted through the advance value $\gamma$, so that the SLC cache block may be generated accordingly and timely.

Figure 6:
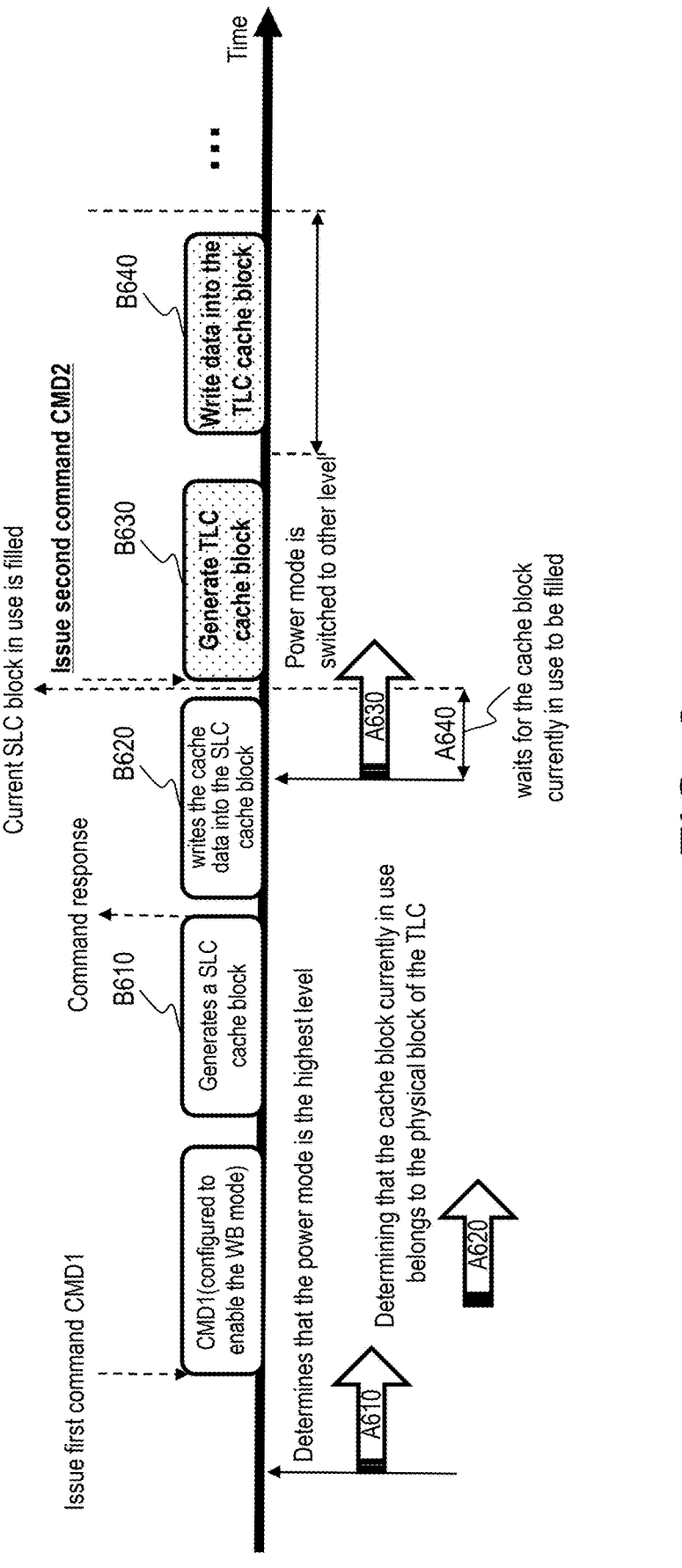
FIG. 6 is a schematic diagram of a memory management method according to an embodiment of the disclosure.

FIG. 6 is a schematic diagram of a memory management method according to an embodiment of the disclosure.

Referring to FIG. 6, in an embodiment, as indicated by an arrow A610, assuming that the storage controller 210 determines that the power mode of the host system 10 is the highest level, and the storage controller 210 obtains a target command CMD1 from the command queue. In addition, before sending a command response corresponding to the target command CMD1, in response to determining that the target command CMD1 is used to enable write booster, and determining that the cache block currently in use belongs to the TLC type (as shown by an arrow A620), the storage controller 210 generates an SLC cache block (for example, selects an SLC physical block as a cache block) (as shown in step B610), write booster of the storage device 20 is enabled, and the command response corresponding to the target command CMD1 (responding that the write booster has been enabled) is sent to the host system 10.

Next, the storage controller 210 writes the cache data into the SLC cache block (as shown in step B620). At this time, as indicated by an arrow A630, the storage controller 210 determines that the current power mode of the host system 10 is switched from the highest level to another level. The storage controller 210 waits in A640 for the cache block currently in use to be filled, and then generates a TLC cache block (as shown in step B630) to write subsequent cache data.

Furthermore, FIG. 6 is only one of the ways in which the solution of the disclosure may be implemented, in another feasible implementation, when the storage controller 210 determines that the current power mode of the host system 10 is switched from the highest level to another level, the controller may also support a command of generating a TLC cache block in the next step without waiting for the SLC cache block to be filled, and the disclosure does not limit this feasible implementation manner.

In an embodiment, as shown in FIG. 6, when the host system 10 is switched from the highest level power mode to the lowest level power mode, switching from the SLC cache block to the TLC cache block is completed. However, in this actual scenario, the block switching actually causes a delay problem. Every time when the SLC cache block is switched to the TLC cache block or the TLC cache block is switched to the SLC cache block, a first write command (write cmd) is executed after waiting for a long time. In this case, due to the delay caused by the block switching, the host system 10 may repeatedly issue write commands and issue a large number of other new write command for completing other write matters, which causes a crowded queue of storage commands and a large number of repeated commands to reside, thereby the burden on the memory resources of the host system 10 is significantly increased and problems such as reduced overall processing efficiency may occur. Therefore, in the disclosure, a special treatment is performed on this problem during the block switching process, which includes the following.

Before or when a switch block is generated, a data operation state is obtained.

When the data operation state is a non-processing state, a priority storage command is obtained from the command queue, in which the priority storage command is used to force data to be written from the cache storage (corresponding to the memory resource) to the storage medium (corresponding to the physical unit storing the data), and the priority storage command includes a first indication parameter.

In response to receiving the first indication parameter, a write restriction command is sent to the host system according to the first indication parameter, the write restriction command includes a second indication parameter, in which when the host system parses the second indication parameter, the logic of the host system sending write commands is modified according to the second indication parameter, so that the host system restricts sending the write commands within a time period; until a return parameter of the first write command from the switch block is received, the original logic of the host system sending the write commands is restored.

Furthermore, the priority storage command also includes detection steps, and the steps are specifically as follows.

In response to determining that the current power mode is the highest level, whether the cache block currently in use is a physical block of the triple-level cell type is determined.

In response to determining that the cache block currently in use belongs to a triple-level cell type, the cache block of the triple-level cell type is frozen.

A physical block of the single-level cell type is used as a new cache block.

It may be understood that the priority storage command is actually a command inserted during switching the blocks (generating different types of cache blocks), which may not only detect the power mode and the current cache block type in real time, but also cleverly solve the delay problem that occurs in the initial stage of switching the block.

Specifically, as shown in FIG. 6, when switching from the SLC cache block to the TLC cache block and generating the TLC cache block, a second command CMD2 is issued at a time point with no commands such as writing data, reading data, or querying data, the second command CMD2 has a function of preventing multiple write commands from being issued, thereby the host system 10 continuously sending different write commands to the storage device is prevented. Furthermore, after the second command CMD2 enters the queue of storage commands, the storage device only retains the first write command after the block switching after receiving the second command CMD2 and return first information to the host side. The first information includes the second indication parameter, and the second indication parameter enables the host system 10 to identify and parse a command to stop issuing write commands (including repeated write commands and write commands for different write objects) to the storage command queue of the storage device. Furthermore, the second command CMD2 is also set to a sync cmd type command, and the sync cmd is used to force changed content or buffered data to be written to the storage medium, in the scenario of the disclosure, the second command CMD2 of the sync cmd type jumps out of regular queue waiting, does not write the data from the cache to the storage medium according to the queue, but assigns a mandatory type of immediate writing to the storage medium. In this way, the second command CMD2 of the disclosure is executed first, and since the command is not issued at the time point of the commands such as writing data, reading data, or querying data, no problems such as data errors is caused. When a cache block is switched and a new type of cache block is generated, the second command CMD2 is used to prevent the dispatch of new write data commands, thereby cleverly weakening the requirement for instantaneous block switching and effectively alleviating problems that may be caused by the delay in the block switching.

Finally, it should be noted that the embodiments are only used to illustrate the technical solutions of the disclosure, and the embodiments are not to limit the disclosure. Although the disclosure has been described in detail with reference to the embodiments, persons skilled in the art should understand that the technical solutions described in the embodiments may still be modified, or some or all of the technical features thereof may be substituted by equivalents. However, these modifications or substitutions do not make the essence of the corresponding technical solutions deviate from the scope of the technical solutions of the embodiments of the disclosure.

What is claimed is:

1. A storage controller, configured to control a storage device disposed with a rewritable non-volatile memory module, wherein the storage controller comprises:

a memory interface control circuit, configured to electrically connect to the rewritable non-volatile memory module, the rewritable non-volatile memory module comprises a plurality of memory dies, and each of the memory dies has a plurality of physical blocks; and a processor, electrically connected to the memory interface control circuit, wherein the processor is configured to:

identify a current power mode of a host system, wherein the power mode comprises a plurality of corresponding power consumption levels from large to small, and the power modes of different power consumption levels correspond to different host speeds;

obtain a target command from a command queue;

in response to determining that the target command is configured to enable a write booster mode, determine whether the power mode is a highest level;

in response to determining that the power mode is the highest level, determine whether a cache block currently in use belongs to a triple-level cell type; in response to determining that the cache block currently in use belongs to the triple-level cell type, freeze the cache block of the triple-level cell type;

use a physical block of a single-level cell type as a new cache block to write cache data into the new cache block; and enable the write booster mode and send an enabling completed response, wherein in response to determining that the target command is not configured to enable the write booster mode, execute the target command;

in response to determining that the current power mode is not the highest level, enable the write booster mode, and send the enabling completed response;

in response to determining that the cache block currently in use does not belong to the physical block of the triple-level cell type, enable the write booster mode, and send the enabling completed response.

2. The storage controller according to claim 1, wherein when generating the physical block of the single-level cell type or generating the physical block of the triple-level cell type, the processor obtains the target command from the command queue;

in response to determining that the target command is configured to detect a level of the power mode and a type of the cache block, the processor determines whether the power mode is the highest level, and determines whether the type of the cache block currently in use belongs to the triple-level cell type;

when the power mode is the highest level and the type of the cache block currently in use belongs to the triple-level cell type, the processor determines that a type of a cache block to be generated next is the single-level cell type.

3. The storage controller according to claim 1, wherein when identifying that the power mode of the host system is adjusted from a first level to a second level, the processor records the current power mode of the host system as the second level,

wherein the processor waits for the cache block currently in use to be fully written, wherein in response to determining that the cache block currently in use is fully written, the processor determines whether the second level is the highest level, wherein in response to the second level being the highest level, the processor uses the physical block of the single-level cell type as the new cache block, wherein in response to the second level not being the highest level, the processor uses the physical block of the triple-level cell type as the new cache block.

4. The storage controller according to claim 1, wherein the processor determines a current host speed stage;

according to the current host speed stage, the processor obtains one or more stage coefficients;

in the same host speed stage, the processor obtains a plurality of host speed values, and according to the plurality of host speed values, the processor obtains an acceleration rate corresponding to the host speed stage;

each time when a power mode of a low level is switched to a power mode of a next high level, the processor obtains an advance value according to the stage coefficient and the acceleration rate corresponding to the power mode of the lower level, and determines a change time of switching to the power mode of the next high level according to the advance value, wherein the power mode of the next high level comprises the power mode of the highest level.

5. The storage controller according to claim 1, wherein before or when a switch block is generated, the processor obtains a data operation state;

when the data operation state is a non-processing state, the processor obtains a priority storage command from the command queue, wherein the priority storage command is configured to force data to be written from a cache storage to a storage medium, and the priority storage command comprises a first indication parameter;

in response to receiving the first indication parameter, the processor sends a write restriction command to the host system according to the first indication parameter, and the write restriction command comprises a second indication parameter, wherein when the host system parses the second indication parameter, the processor modifies logic of the host system sending write commands according to the second indication parameter, so that the host system restricts sending of the write commands within a time period, and until a return parameter of the first write command corresponding to the switch block is received, the processor restores the original logic of the host system sending the write commands.

6. A memory management method for a storage controller, comprising:

identifying a current power mode of the host system, wherein the power mode comprises a plurality of corresponding power consumption levels from large to small, and the power modes of different power consumption levels correspond to different host speeds;

obtaining a target command from a command queue;

in response to determining that the target command is configured to enable a write booster mode, determining whether the power mode is a highest level;

in response to determining that the power mode is the highest level, determining whether a cache block currently in use belongs to a triple-level cell type;

in response to determining that the cache block currently in use belongs to the triple-level cell type, freezing the cache block of the triple-level cell type;

using a physical block of a single-level cell type as a new cache block to write cache data into the new cache block; and enabling the write booster mode and send an enabling completed response;

wherein in response to determining that the target command is not configured to enable the write booster mode, the target command is executed;

in response to determining that the current power mode is not the highest level, the write booster mode is enabled, and the enabling completed response is sent;

in response to determining that the cache block currently in use does not belong to the physical block of the triple-level cell type, the write booster mode is enabled, and the enabling completed response is sent.

7. The memory management method according to claim 6, wherein the method further comprises:

when generating the physical block of the single-level cell type or generating the physical block of the triple-level cell type, obtaining the target command from the command queue;

in response to determining that the target command is configured to detect a level of the power mode and a type of the cache block, determining whether the power mode is the highest level, and determining whether the type of the cache block currently in use belongs to the triple-level cell type; and when the power mode is the highest level and the type of the cache block currently in use belongs to the triple-level cell type, determining a type of a cache block to be generated next is the single-level cell type.

8. The memory management method according to claim 6, wherein the method further comprises:

when identifying that the power mode of the host system is adjusted from a first level to a second level, recording the current power mode of the host system as the second level;

waiting for the cache block currently in use to be fully written;

in response to determining that the cache block currently in use is fully written, determining whether the second level is the highest level;

in response to the second level being the highest level, using the physical block of the single-level cell type as the new cache block; and in response to the second level not being the highest level, using the physical block of the triple-level cell type as the new cache block.

9. The memory management method according to claim 6, wherein the method further comprises:

determining a current host speed stage is determined;

according to the current host speed stage, obtaining one or more stage coefficients;

in the host speed stage, obtaining a plurality of host speed values, and according to the plurality of host speed values, obtaining an acceleration rate corresponding to the host speed stage;

each time when a power mode of a low level is switched to a power mode of a next high level, obtaining an advance value is obtained according to the stage coefficient and the acceleration rate corresponding to the power mode of the lower level, and determining a change time of switching to the power mode of the next high level according to the advance value, wherein the power mode of the next high level comprises the power mode of the highest level.

10. The memory management method according to claim 6, wherein the method further comprises:

before or when a switch block is generated, obtaining a data operation state;

when the data operation state is a non-processing state, obtaining a priority storage command from the command queue, wherein the priority storage command is configured to force data to be written from a cache storage to a storage medium, and the priority storage command comprises a first indication parameter; and in response to receiving the first indication parameter, sending a write restriction command to the host system according to the first indication parameter, wherein the write restriction command comprises a second indication parameter; when the host system parses the second indication parameter, modifying logic of the host system sending write commands according to the second indication parameter, so that the host system restricts sending the write commands within a time period; until a return parameter of the first write command corresponding to the switch block is received, restoring the original logic of the host system sending the write commands.

11. A storage device, comprising:

a connection interface circuit, configured to electrically connect to the host system;

a rewritable non-volatile memory module, wherein the rewritable non-volatile memory module comprises a plurality of memory dies, each of the memory dies has a plurality of physical blocks, and each of the physical blocks has a plurality of physical pages; and a storage controller, electrically connected to the connection interface circuit and the rewritable non-volatile memory module, wherein the storage controller is configured to:

identify a current power mode of a host system, wherein the power mode comprises a plurality of corresponding power consumption levels from large to small, and the power modes of different power consumption levels correspond to different host speeds;

obtain a target command from a command queue;

in response to determining that the target command is configured to enable a write booster mode, determine whether the power mode is a highest level;

in response to determining that the power mode is the highest level, determine whether a cache block currently in use belongs to a triple-level cell type;

in response to determining that the cache block currently in use belongs to the triple-level cell type, freeze the cache block of the triple-level cell type;

use a physical block of a single-level cell type as a new cache block to write cache data into the new cache block; and enable the write booster mode and send an enabling completed response, wherein in response to determining that the target command is not configured to enable the write booster mode, execute the target command;

in response to determining that the current power mode is not the highest level, enable the write booster mode, and send the enabling completed response;

in response to determining that the cache block currently in use does not belong to the physical block of the triple-level cell type, enable the write booster mode, and send the enabling completed response.

12. The storage device according to claim 11, wherein when generating the physical block of the single-level cell type or generating the physical block of the triple-level cell type, the storage controller obtains the target command from the command queue;

in response to determining that the target command is configured to detect a level of the power mode and a type of the cache block, the storage controller determines whether the power mode is the highest level, and determines whether the type of the cache block currently in use belongs to the triple-level cell type;

when the power mode is the highest level and the type of the cache block currently in use belongs to the triple-level cell type, the storage controller determines a type of a cache block to be generated next is the physical block of the single-level cell type.

13. The storage device according to claim 11, wherein when identifying that the power mode of the host system is adjusted from a first level to a second level, the storage controller records the current power mode of the host system as the second level, wherein the storage controller waits for the cache block currently in use to be fully written, wherein in response to determining that the cache block currently in use is fully written, the storage controller determines whether the second level is the highest level, wherein in response to the second level being the highest level, the storage controller uses the physical block of the single-level cell type as the new cache block, wherein in response to the second level not being the highest level, the storage controller uses the physical block of the triple-level cell type as the new cache block.

14. The storage device according to claim 11, wherein the storage controller determines a current host speed stage;

according to the current host speed stage, the storage controller obtains one or more stage coefficients;

in the host speed stage, the storage controller obtains a plurality of host speed values, and according to the plurality of host speed values, obtains an acceleration rate corresponding to the host speed stage;

each time when a power mode of a low level is switched to a power mode of a next high level, the storage controller obtains an advance value according to the stage coefficient and the acceleration rate corresponding to the power mode of the lower level, determines a change time of switching to the power mode of the next high level according to the advance value, wherein the power mode of the next high level comprises the power mode of the highest level.

15. The storage device according to claim 11, wherein before or when a switch block is generated, the storage controller obtains a data operation state;

when the data operation state is a non-processing state, the storage controller obtains a priority storage command from the command queue, wherein the priority storage command is configured to force data to be written from a cache storage to a storage medium, and the priority storage command comprises a first indication parameter;

in response to receiving the first indication parameter, the storage controller sends a write restriction command to the host system according to the first indication parameter, and the write restriction command comprises a second indication parameter, wherein when the host system parses the second indication parameter, the storage controller modifies logic of the host system sending write commands according to the second indication parameter, so that the host system restricts sending of the write commands within a time period, and until a return parameter of the first write command corresponding to the switch block is received, the host system restores the original logic of the host system sending the write commands.

* * * * *